Figure 6:
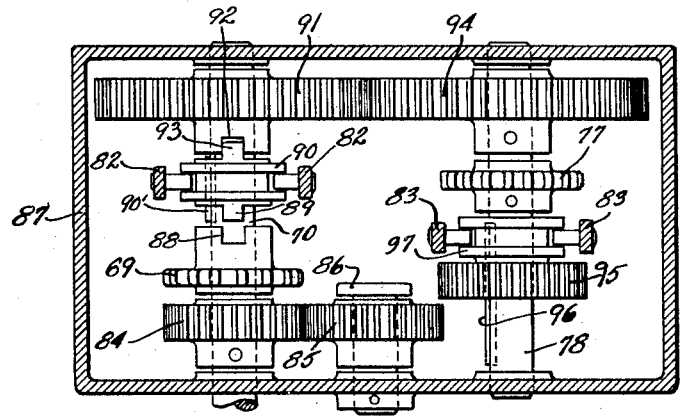

May 26, 1936.　　　F. VETORINO　　　2,041,984
SPOT WELDING APPARATUS
Filed March 16, 1932　　　5 Sheets-Sheet 1
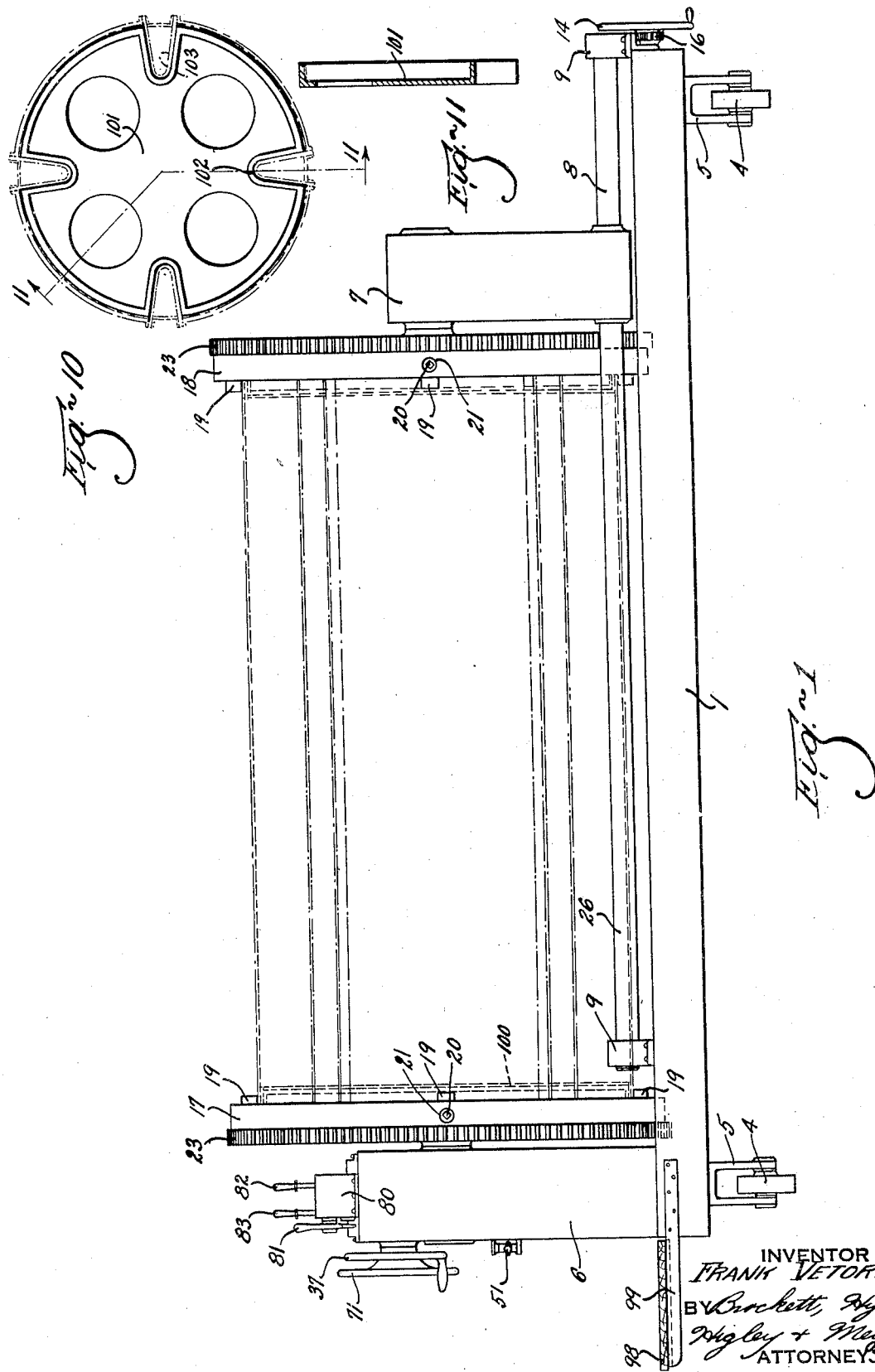

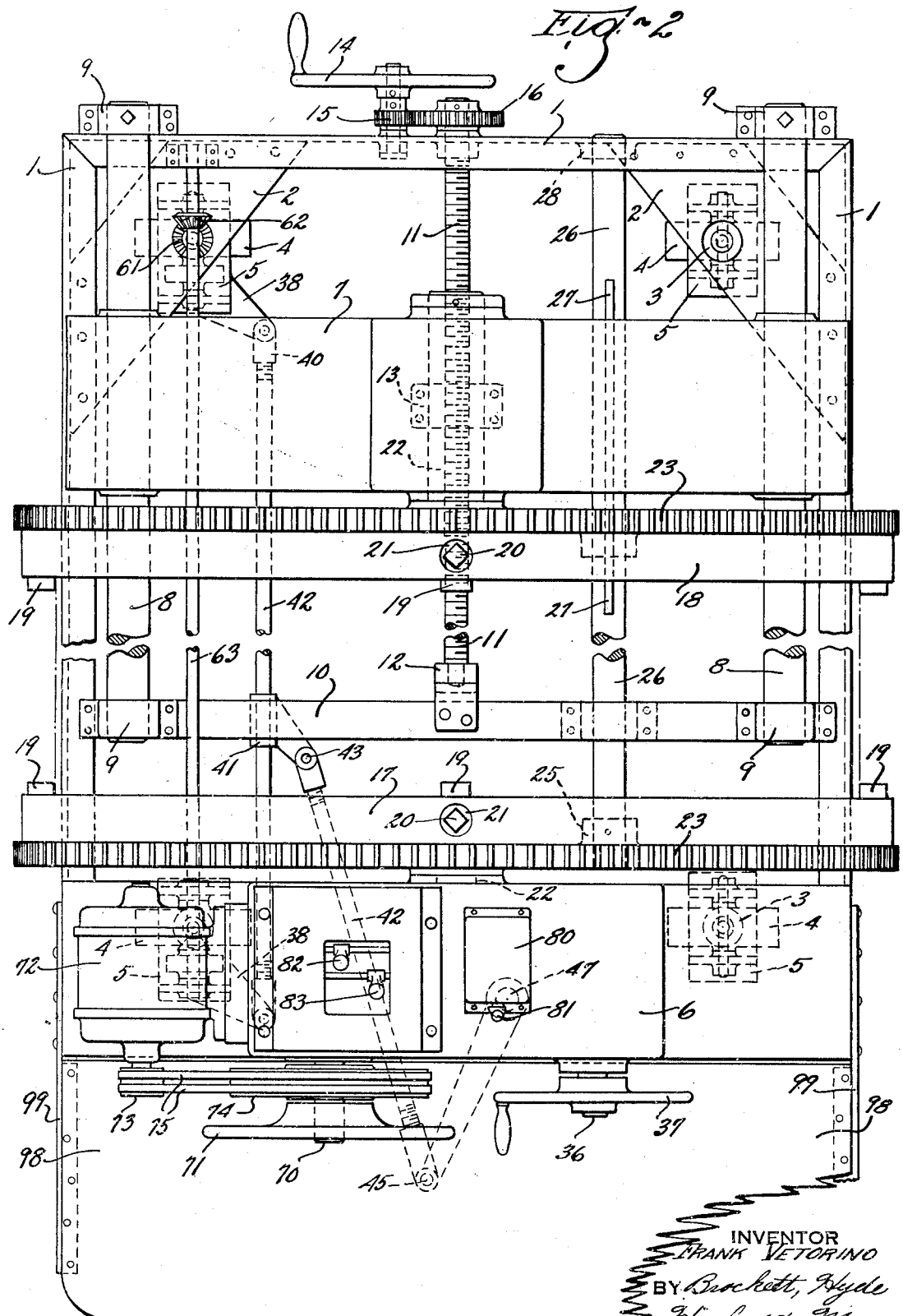

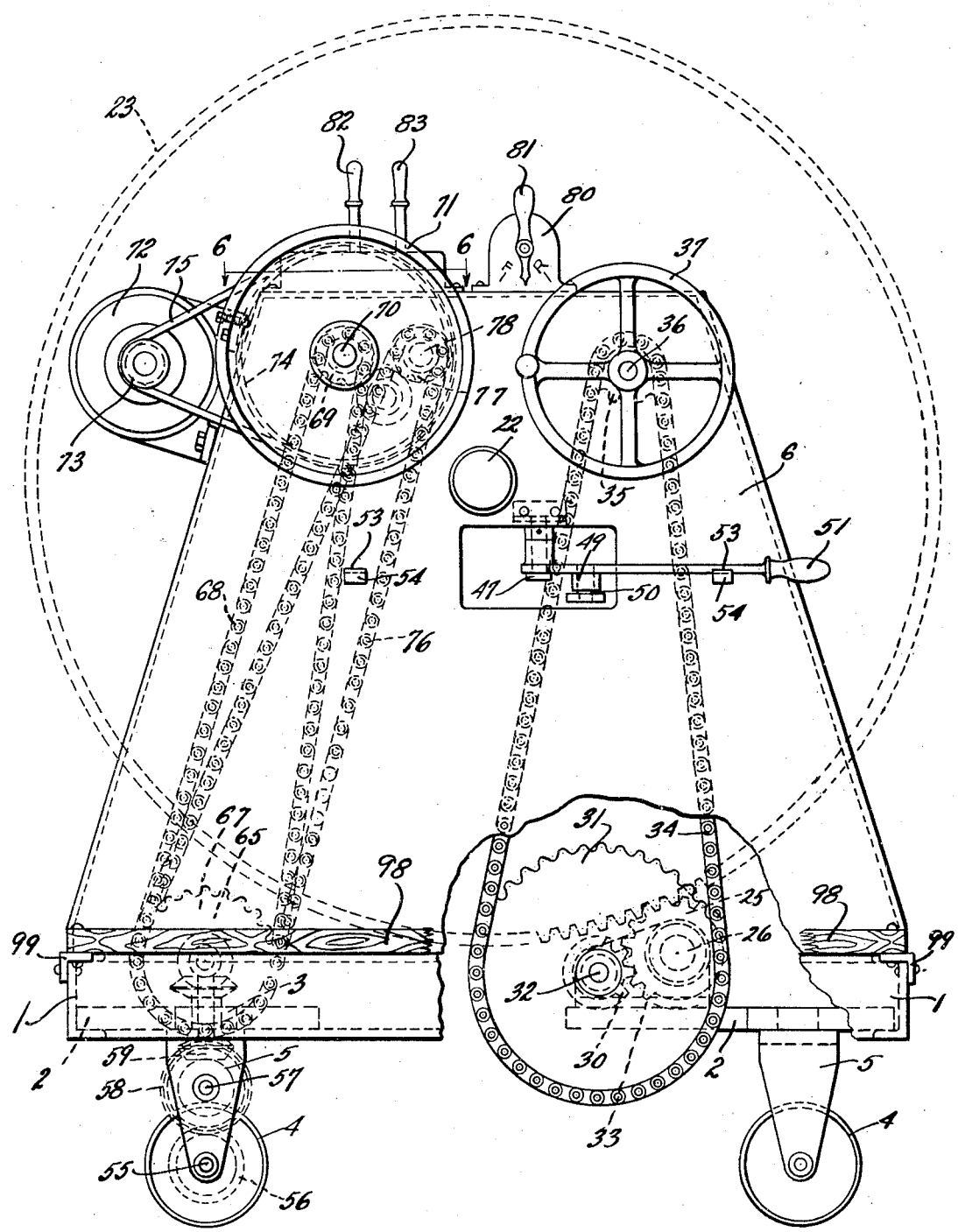

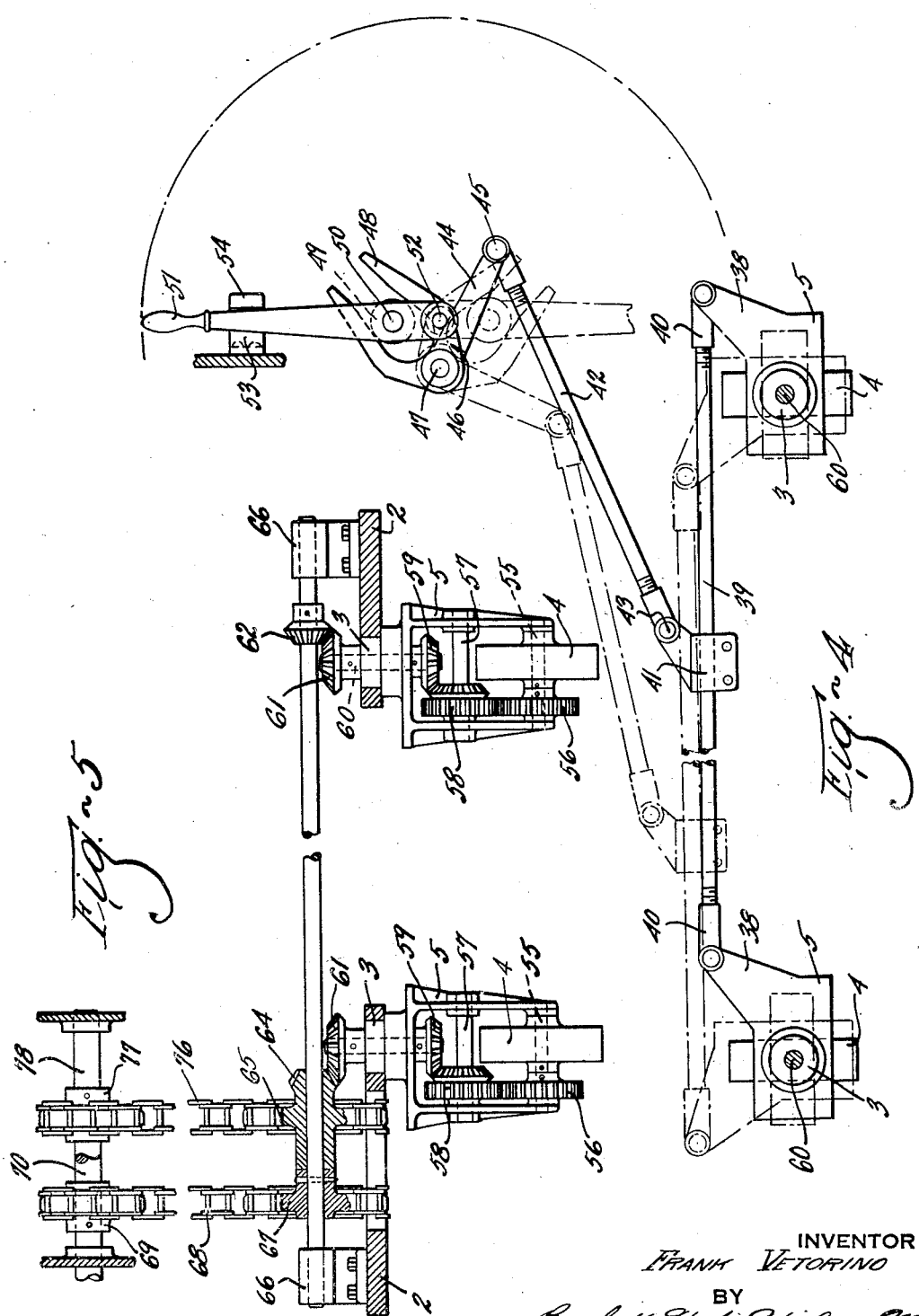

INVENTOR
FRANK VETORINO
ATTORNEYS

Patented May 26, 1936

2,041,984

UNITED STATES PATENT OFFICE 2,041,984

SPOT WELDING APPARATUS

Frank Vetorino, Cincinnati, Ohio, assignor to The American Laundry Machinery Company, Cincinnati, Ohio, a corporation of Ohio Application March 16, 1932, Serial No. 599,155

9 Claims. (Cl. 29—89)

My invention relates to work holding apparatus and, particularly, to the type of work holding apparatus adapted to hold various parts that go to make up a washing machine cylinder, such as the partially or wholly fabricated framework thereof, securely in a predetermined location and position while other parts such as the cylinder sheets are being affixed thereto as by spot welding, and one which can be readily manipulated or moved from place to place under power or otherwise to facilitate the assembly of a cylinder structure as, for example, presenting various parts of the cylinder to a more or less fixed spot welding apparatus.

One object of my invention is to provide a work holding apparatus embodying means for supporting the partially or wholly fabricated framework, such as the end heads or head sheets and lifting ribs, of a washing machine cylinder in a predetermined position which renders the application and securing of the cylinder body sheets and other parts thereto substantially easy, together with means for adjusting the held framework of the cylinder to positions to bring the desired point on the cylinder framework within the working range of a spot welding apparatus or the like.

Another object of my invention is to provide a work holding apparatus that takes the form of either a power or a manually operated vehicle readily movable from one place to another, and such that the direction of travel thereof can be readily changed and easily controlled. This is accomplished by providing a movable chassis on which the work holding apparatus is mounted which consists of four traction elements such as casters, one being located at each corner of the chassis, with a part of the casters being positively driven and with the swivel of two of the casters unrestrained while the swiveling of the two remaining casters is restrained and controlled by manually operated mechanism for changing the direction of travel of the fixture or maintaining a straight line course in the direction of travel, the direction control mechanism being operable from one end of the apparatus.

Still another object of my invention is to provide a manually operated travel transmitting device, manipulated from the control end of the apparatus which provides a means for changing the direction of travel of the work holding apparatus as an entirety and for revolving the apparatus about its vertical axis.

Various other objects and advantageous features of my invention will be seen in the following description and one embodiment thereof may be seen in the accompanying drawings wherein similar characters of reference designate corresponding parts, and wherein:

Fig. 1 is a side elevation of a work holding apparatus constructed for the purpose hereinbefore set out and in accordance with my invention; Fig. 2 is a top plan view of the work holding apparatus shown in Fig. 1; Fig. 3 is a view in front elevation, with parts broken away to show the detailed construction of the mechanism for revolving the fabricated framework of a cylinder mounted in the work holding apparatus about its longitudinal axis; Fig. 4 is a detailed view showing the means for changing the position of the traction elements supporting the apparatus whereby the direction of travel or swiveling of the apparatus may be controlled; Fig. 5 is a detailed view, partly in section, showing the driving connection to the traction elements on which the work holding apparatus is mounted; Figs. 6, 7, 8 and 9 are top plan views, partly in section, taken on the line 6—6 of Fig. 3 and showing the mechanism for transmitting motion to the traction elements on which the work holding apparatus is mounted; Fig. 10 is a plan view of an adapter that may be assembled with the head sheet of a cylinder framework to prevent crushing or distortion thereof; and Fig. 11 is a sectional view taken on the line A—A of Fig. 10.

Referring to the drawings, the holding apparatus consists of a chassis or base construction 1, preferably of heavy channel irons, provided at each corner, in this instance, with gusset plates 2 to rigidify the chassis construction, the gusset plates 2 being arranged to receive a stud portion 3 of a series of traction elements such as the casters 4, and providing a bearing wherein caster brackets 5 swivel when a change of direction of movement for the work holding apparatus as a vehicle is desired. The base or chassis 1 supports an upright member 6 at one end whereon is attached the various controls necessary for the operation of the work holding apparatus, the upright member being rigidly attached to the chassis or base 1.

A rear upright member 7 similar to the upright member 6 is slidably mounted on the chassis or base 1 by being supported on shafts 8 which are, in turn, supported by brackets 9, the rear pair of brackets being attached to the rear channel iron forming one end of the chassis or base while the front pair of brackets are supported by a horizontally disposed cross bar 10 connected to the channel irons that form the armature 22 past said pole pieces is reversed, to compensate for such reversal.

Suitably mounted for oscillation upon pivots 30 mounted in intermediate uprights 13 are two solenoids 31. Since the solenoids 31 are identical, only one will be described in detail.

Referring to Fig. 3, it will be seen that the solenoid 31 comprises a coil 32 wound upon a cylindrical shell 33 provided with radially extending flanges 34 and 35 at its opposite ends. A core 36 is slidably received within the shell 33; and it will be understood that, when the coil 32 is energized, it will tend to draw the core 36 into the position illustrated in Fig. 3.

Rigidly connected to one end of the core 36 is a stem 37 projecting axially therefrom and slidably received in a shell 38 having a flange 39 suitably secured to the flange 34 of the shell 33. A stem 40 is rigidly secured to the opposite end of the core 36 and projects axially therefrom, being slidably mounted in the shell 41 having a flange 42 suitably secured to the flange 35 of the shell 33.

At its free end which projects beyond the shell 38, the stem 37 is formed with a down-turned end 43 forming a part of a switch indicated generally at 44. A finger 45, pivoted at 46 to the stem 37, is normally urged to the position illustrated in Fig. 3 by a spring 47 abutting at one end the finger 45 and at the other end the hook 43. Said hook 43 carries a contact point 48 and the finger 45 carries a cooperating contact point 49, said contact points being suitably connected in an electric circuit in a manner later to be described.

Similarly, the free end of the stem 40 is down-turned to form a hook 50 comprising a part of a switch indicated generally at 51. A finger 52 is pivoted at 53 to said stem 40 and a spring 54 normally urges said finger 52 to the position illustrated in Fig. 3. The hook 50 carries a contact point 55, and the finger 52 carries a cooperating contact point 56, said contact points being suitably connected in an electric circuit hereinafter to be described.

A combined bumper and switch, indicated at 57, is slidably mounted upon one slideway 23, and mechanism is provided for shifting said element 57 toward and away from the armature 24. Such mechanism comprises a nut 58 swivelled to said element 57 and threadedly receiving a screw 59 which is non-reciprocably mounted in a bearing 60 swivelled to the uprights 12, and which carries a hand-wheel 61. A similar bumper and switch indicated generally at 62 is slidably mounted upon the other slideway 23, and is similarly adjustable through the medium of a similar screw operated by a hand-wheel 63.

Figure 7:
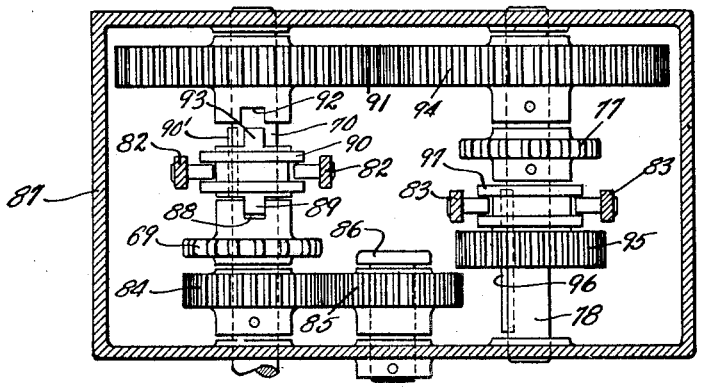

Since the elements 57 and 62 are identical, only one will be described. Referring to Fig. 7, it will be seen that each of the elements 57 and 62 comprises a casing 64 in which is mounted for reciprocation a plunger 65 carrying a projection 66 which protrudes from the casing 64 and which may preferably be made of rubber or some other relatively flexible and resilient material. Slidably mounted within the casing 64 is a rod 67 carrying at one end a contact element 69 adapted, at times, to bridge two electric contact points 70 and 71, said contact points being connected in an electric circuit hereinafter to be described. The plunger 65, when shifted to the right as viewed in Fig. 7, compresses the spring 68 and, just before it reaches the end of its stroke, engages the rod 67 to shift the element 69 into contact with the points 70 and 71. Said spring 68, of course, normally tends to hold the elements 65 and 67 in the positions illustrated in Fig. 7.

Each of the members 20 of the pendulum 17 carries a laterally projecting pin 72 and, as is clearly indicated in Fig. 4, said pins are adapted, as the pendulum swings, to engage the fingers 45 and 52. The mechanism is so proportioned that, as the pendulum nears the lefthand limit of its stroke, as viewed in Fig. 1, the pins 72 will engage the fingers 45 of the stems 37. As the pendulum continues to swing toward the lefthand limit of its stroke, the fingers 45 are moved to bring their contact points 49 into contact with the contact points 48; and, as the pendulum continues to swing, the stems 37 are carried with the pendulum, thereby shifting the cores 36 toward the left, and out of their median position. As the pendulum reaches the lefthand limit of its stroke, it strikes the projection 66 of the element 57 to shift the plunger 65 thereof, thereby moving the element 69 into bridging contact with the points 70 and 71.

Figure 8:
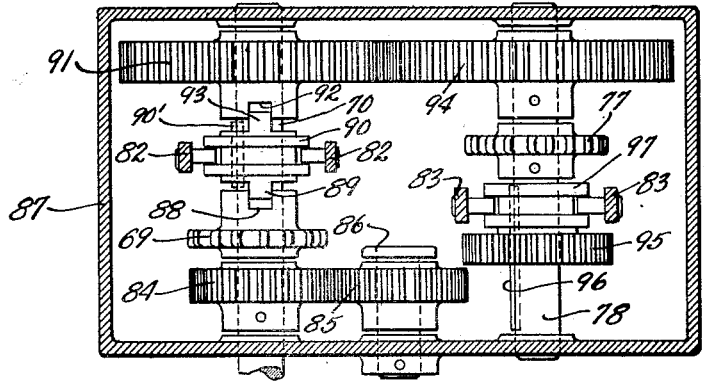
Figure 9:
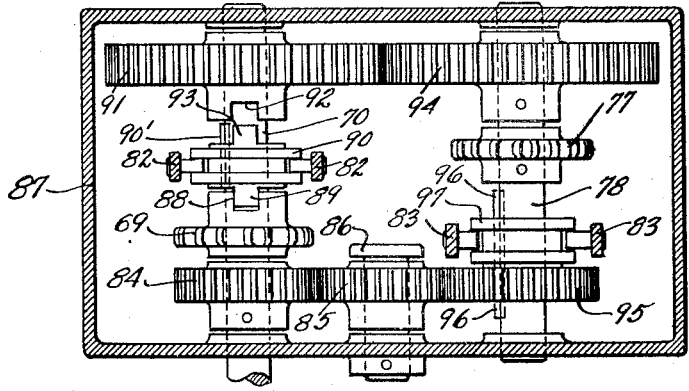

Referring, now, to Fig. 8, it will be seen that the solenoid winding 32 is connected in a circuit including contact points 81 and 82 adapted to be bridged by an element 79 of a magnetically operated switch indicated generally at 73. Said switch comprises a solenoid coil 74, the core of which comprises a stem 75 carrying at its upper end a bridge piece 76 adapted to bridge contacts 77 and 78 connected in electric circuits hereinafter to be described. The bridge piece 79 is carried by, but electrically insulated from, said stem 75 by an insulating block 80.

A source of electric current is indicated by the two wires 83 and 84. A wire 85 connects the wire 83 with one end of the coil 74. The opposite end of said coil 74 is connected by a wire 86 with a wire 87 which, in turn, is connected to the contact point 49. The contact point 48 is connected by a wire 88 with a wire 89 connected to the contact point 71 of the switch 57. The contact point 70 of the switch 57 is connected by a wire 90 to a wire 91 which is connected to the line wire 84.

It will thus be seen that, when the pin 72 first moves the finger 45 to shift the contact point 49 into contact with the contact point 48, no circuit is established; but, when the armature 22 strikes the projection 66 of the switch 57 to shift the element 69 into bridging contact with the points 70 and 71, a circuit is established to energize the coil 74, as follows:—Line 83, wire 85, coil 74, wire 86, wire 87, contact point 49, contact point 48, wire 88, wire 89, contact point 71, element 69, contact point 70, wire 90, wire 91, to line 84.

A wire 92 connects the wire 85 with the contact point 81. The contact point 82 is connected by a wire 93 with one end of the solenoid coil 32; and the opposite end of said coil 32 is connected by a wire 94 to the line wire 84.

Thus, when the coil 74 is energized by closure of the above traced circuit, the stem 75 is shifted upwardly, as viewed in Fig. 8, to move the bridge piece 79 into bridging contact with the contact points 81 and 82; and a circuit energizing the solenoid coil 32 is established as follows:—Line wire 83, wire 85, wire 92, contact point 81, bridge piece 79, contact point 82, wire 93, coil 32, wire 94, to line 84.

It will be understood of course, that the coils of both solenoids 31 are simultaneously energized to return the cores 36 simultaneously to their median positions. It will also be seen that, as said coils are returned to their median positions, an impulse is imparted to the pendulum 17, through the pins 72, tending to swing said pendulum toward the right-hand limit of its stroke as viewed in Fig. 1. The first movement of the pendulum 17 away from the left-hand limit of its stroke releases the plunger 65 of the element 57 and permits the spring 68 to return the element 69 to the position of Fig. 7, thus breaking the above-described circuit energizing the coil 74. It is desirable, however, to maintain energization of the coils 32 until the cores 36 have been returned to their median positions illustrated in Fig. 3. Energization of the coils 32 can be maintained only by holding the bridge piece 79 in contact with the points 81 and 82; and it follows that it is necessary to maintain energization of the coil 74 until such time as the core 36 has been returned to its median position.

The pendulum under the combined influence of gravity and the kick imparted to it by the initial movement of the core 36 toward its middle position may possibly descend toward its middle position more rapidly than the concurrent movement of the core 36 toward its middle position, or the magnetic flux of the solenoid may be so designed that the speed of movement of core 36 toward the middle position will be equal to the descending movement of the pendulum. In any event core 36, under the influence of its energizing coil, will not pass materially beyond its middle position, as is well known.

A wire 95 connects the wire 88 with a wire 96 connected to the contact point 78. The contact point 77 is connected through a wire 97 to the wire 91 which is connected to the line wire 84. When the stem 75 is shifted upwardly by energization of the coil 74 to bridge the contact points 81 and 82, the bridge piece 76 is likewise shifted upwardly into bridging relation with the contact points 77 and 78, thus establishing a holding circuit for maintaining energization of the coil 74 regardless of the position of the element 69, such holding circuit being traced as follows:—Line wire 83, wire 85, coil 74, wire 86, wire 87, contact point 49, contact point 48, wire 88, wire 95, wire 96, contact point 78, bridge piece 76, contact point 77, wire 97, wire 91, to line wire 84. Thus, although the original energizing circuit for the coil 74 including the element 69 is broken as the armature 22 starts to swing toward the right-hand limit of its stroke, the energizing circuit for the coils 32 is held closed through the above-described shunt circuit until such time as said above-described shunt circuit is broken at 48—49.

Throughout the movement of the cores 36 toward their median positions, the solenoids 31 are acting as motors urging the pendulum 17 toward the right-hand end of its stroke. When said cores reach their median position, the momentum of the pendulum, combined with the force of gravity, causes the pendulum to continue on its stroke, carrying the pins 72 out of contact with the fingers 45, whereby the springs 47 are permitted to return the fingers 45 to the positions of Figs. 3 and 8, thereby breaking the energizing circuit for the coil 74, permitting the stem 75 to drop to the position of Fig. 8, and breaking the energizing circuits for the coils 32.

The pendulum 17 continues to swing past the stator 24 until the pins 72 engage the fingers 52 and move the contact points 56 into contact with the contact points 55. Continuing on its stroke, the pendulum shifts the cores 36 toward the right and finally strikes the projection 66 of the element 62, moving the element 69 of the switch 62 into contact with contact points 70 and 71 of said switch 62. When said contact points 70 and 71 of the switch 62 are bridged, an energizing circuit for the coil 74 is established as follows:—line wire 83, wire 85, coil 74, wire 86, wire 98, contact point 56, contact point 55, wire 99, wire 100, contact point 70, element 69, contact point 71, and wire 101, to line wire 84. The bridge pieces 79 and 76 are thus moved into bridging relation, respectively, with the contact points 81 and 82 and the contact points 77 and 78 to establish an energizing circuit for the coil 32 as follows:—line wire 83, wire 85, wire 92, contact point 81, bridge piece 79, contact point 82, wire 93, coil 32, wire 94, to line wire 84; and to establish a holding circuit for the coil 74 as follows:—line wire 83, wire 85, coil 74, wire 86, wire 98, contact point 56, contact point 55, wire 99, wire 102, wire 96, contact point 78, bridge piece 76, contact point 77, wire 97, and wire 91, to line wire 84.

The energization of the coils 32 will thus be continued to return the cores 36 to their median positions until such time as the pins 72 release the fingers 52 to permit the springs 54 to break the holding circuit at 55—56, thus permitting the stem 75 to drop to the position of Fig. 8.

This cycle will be continued so long as the circuits of Fig. 8 are supplied with current.

When the disclosed mechanism is used under circumstances wherein the reversal of generated current in response to the reversal of direction of movement of the armature 22 would be undesirable, an electrically actuated reversing switch 103 of well known form is positioned adjacent one of the solenoids 31. It will be obvious that, as the pendulum moves toward the left-hand end of its stroke as viewed in Fig. 1, the solenoids 31 will be tilted in a clockwise direction as viewed in Fig. 1; and, as the pendulum swings toward the opposite end of its stroke, the solenoids 31 will be tilted in a counterclockwise direction, as viewed in Fig. 1. Control buttons 104 and 105 are mounted on the upper surface of the switch 103, and said buttons control the switch 103 connected in the circuits of the armature windings in such a manner that, when the button 104 is depressed, the leads from said armature windings will be associated in one arrangement and, when the button 105 is depressed said leads will be associated in a different arrangement to compensate for the reversal in direction of movement of said armature 22. Thus, as the pendulum swings toward the right-hand limit of its stroke, the solenoid 31 will be tilted to depress the button 104; and as the pendulum nears the opposite limit of its stroke, the solenoid 31 will depress the button 105.

It will be obvious that, depending upon the manner of wiring the armature and the stator, and upon the manner of drawing current from the armature, either direct or alternating current may be generated, and that the generated current may be used in a single phase or in any polyphase circuit. The manner of wiring the mechanism will also determine the working voltage; and the frequency of the generated current may be varied by varying the positions of the switches 57 and 62. While I prefer to use an electric, reciprocating motor for driving the armature, it will be obvious that the armature may be driven by any other suitable power will result in rotation of the spur gear 95 and shaft 78 in the same direction.

In the operation of the transmission mechanism just described for controlling the travel of the work holding apparatus, when the parts of the transmission mechanism are in the position shown in Fig. 6 with the clutch 90 engaging with the spur gear 91, rotation of the shaft 70 by the power unit 72 or hand wheel 71, while not being effective to cause operation of the sprocket 69 loosely mounted on the shaft 70 and thereby positive drive of the caster 4 shown on the right in Fig. 5, will be effective to drive the spur gear 94, shaft 78, and sprocket 77 in the direction opposite to the direction of rotation of the shaft 70 with a positive drive of the sprocket 77 which will cause positive actuation of the caster 4 on the left-hand side of the apparatus as shown in Fig. 5. The direction of movement of the caster 4 may be reversed by reversing the direction of operation of the power unit 72 through the reversing switch 80, or reversing the direction of rotation of the manually operated hand wheel 71. The operation of this caster 4 causes a swiveling of the work holding apparatus about the undriven caster 4 on the right-hand side of the apparatus as shown in Fig. 5 as a pivot. Of course, the degree of swiveling action of the work holding apparatus may be varied by changing the position of the casters 4 under the control of the guiding means hereinbefore described to change the position of these casters.

To cause a swiveling of the work holding apparatus in the reverse direction and about the caster 4 on the left-hand side of Fig. 5 as a pivot, the clutch 90 is moved to the position shown in Fig. 7 wherein it engages and clutches the sprocket 69 to the shaft 70 but leaves the shaft 78 operatively disconnected from the shaft 70 whereby such shaft will remain idle. With the parts in this position, the sprocket 69 will be positively driven in one direction or the other by operation of the power unit 72 or hand wheel 71 in one direction or the other to positively drive the caster 4 on the right-hand side of the apparatus as shown in Fig. 5 in one direction or the other whereby the work holding apparatus will be swiveled about the non-positively driven caster 4 on the left-hand side of the apparatus as shown in Fig. 5 as a pivot, the degree of swiveling, as previously described, being controlled by the guiding means effective on the two casters to change the direction thereof.

The transmission mechanism also embodies means for providing a positive drive to both of the casters 4 shown in Fig. 5, to operate the casters in the same directions whereby the work holding apparatus may be caused to travel in a straight line. As shown in Fig. 8, the clutch 90 is in a substantially central position wherein it is effective to clutch both the sprocket 69 and the spur gear 91 to the shaft 70 so that they will be operated thereby. As hereinbefore described, clutching of the sprocket 69 to the shaft 70 causes the caster 4 on the right-hand side of the work holding apparatus as shown in Fig. 5 to be positively driven. Likewise, clutching of the spur gear 91 to the shaft 70 causes the spur gear 94, sprocket 77, and shaft 78 to be driven by the shaft 70 but in a direction opposite to the direction of movement thereof. Also, clutching of the spur gear 91 to the shaft 70 causes positive actuation of the sprocket 77 and positive drive of the caster 4 on the left-hand side of the work holding apparatus as shown in Fig. 5. As shown in Fig. 5, the bevel gears 62 and 64 being oppositely arranged and being oppositely driven by the rotation of the shafts 70 and 78 in opposing directions will cause actuation of the two casters 4 in the same direction which will be effective to move the work holding apparatus in a line. Of course, as hereinbefore described, the line movement of the work holding apparatus may be reversed as to direction by reversing the rotation of the power unit 72 or operation of the hand wheel 71 and the direction of the line movement may be controlled by the guiding mechanism hereinbefore described.

Inasmuch as it may also be desirable at times to rotate the work holding apparatus about substantially its vertical axis, the transmission is so constructed that the parts may be so moved as to cause rotation of the shafts 70 and 78 simultaneously but in the same direction which, through the mechanism as hereinbefore described, will cause operation of the bevel gears 62 and 64 in the same direction and, due to their arrangement, actuation of the casters 4 as shown in Fig. 5 in opposite directions. This, as will be readily noted, will result in rotation of the apparatus about substantially its vertical axis.

As shown in Fig. 1, a platform 98 is provided at one end of the work holding apparatus mounted on angles 99, the platform being so disposed that an operator may stand thereon and have access to substantially all of the control mechanism for the work holding apparatus and particularly the face plate revolving mechanism, the work holding apparatus propelling mechanism, the transmission control mechanism, and the power unit control switch.

In Figs. 10 and 11, I have shown the adapter hereinbefore mentioned for assembly with the head sheets 100 of a cylinder structure to prevent crushing or distortion of the head sheets when they are clamped to the face plates 17 and 18 as hereinbefore described. This adapter consists of an annular member 101 of relatively heavy material and of a size to fit within the head sheets 100 as shown by the dotted lines in Fig. 1, the adapter being provided with U-shaped grooves 102 for the reception of the lifting ribs 103 of the cylinder framework.

With the above construction, I have provided a work holding apparatus that is adapted to receive the partially fabricated framework of a cylinder construction which, in the case of washing machines or drying tumblers, comprises head sheets and lifting ribs in a position wherein the cylinder sheets and other cylinder parts may be easily applied thereto and readily secured thereon, as by spot welding. The holding apparatus is also so constructed that the partially fabricated framework of a cylinder may be rotated about its longitudinal axis to present any desired point of the framework in a position in which parts may be easily applied thereto. Further, the holding means is adjustable to accommodate cylinders of various sizes.

In addition to the specific holding apparatus, I have provided a work holding apparatus that is readily movable from place to place either manually or by power operated means together with guiding means for controlling the direction of movement of the work holding apparatus and a driving means that may be adapted to the manipulation of the work holding apparatus into any position desired by swiveling, rotating, and line movement. Various other advantageous features will be readily apparent.

What I claim is:

1. In work holding apparatus of the character described, comprising, work holding and rotating means on a chassis, the combination on said chassis of traction elements thereon, two of which are disposed in alignment, drive means for said two aligned traction elements including a variable drive transmission mechanism, means for controlling said variable drive transmission mechanism to actuate said two driven traction elements simultaneously or individually and in either direction, and guiding means effective on said driven traction elements for controlling the line of movement of said chassis.

2. In work holding apparatus of the character described, comprising, work holding and rotating means on a chassis, the combination on said chassis of traction elements thereon, two of which are disposed in alignment, drive means for said two aligned traction elements including a variable drive transmission mechanism, means controlling said variable drive transmission mechanism to actuate said two driven traction elements simultaneously or individually and in either direction and to actuate said two driven traction elements simultaneously but each in a direction opposite to the other, and guiding means effective on said driven traction elements for controlling the line of movement of said chassis.

3. In work holding apparatus of the character described, comprising, work holding and rotating means on a chassis, the combination on said chassis of traction elements thereon, a part of which are disposed and maintained in alignment, drive means for said aligned traction elements including a variable drive transmission mechanism, the remaining traction element or elements moving idly, means controlling said variable drive transmission mechanism to actuate said aligned driven traction elements simultaneously or individually and in either direction, and guiding means effective on said driven traction elements for controlling the line of movement of said chassis.

4. In work holding apparatus of the character described, comprising, work holding and rotating means on a chassis, the combination on said chassis of traction elements thereon, a part of which are disposed and maintained in alignment, drive means for said aligned traction elements including a variable drive transmission mechanism, a motor means and manually operated mechanism for operating said variable drive transmission mechanism, means for selectively coupling said motor means and said manually operated mechanism with said variable drive transmission mechanism, means controlling said variable drive transmission mechanism to actuate said aligned driven traction elements simultaneously or individually and in either direction, and guiding means effective on said aligned driven traction elements for controlling the line of movement of said chassis.

5. In work holding apparatus of the class described comprising work holding mechanism mounted on a chassis; means for moving the chassis including more than two traction elements mounted for swiveling movement and adapted to support said chassis for movement over a surface; at least two of said elements being provided with guiding means adapted to swivel said elements simultaneously through at least 90°, driving means for said elements including a variable drive transmission mechanism, and means for controlling said transmission mechanism to actuate said elements simultaneously or individually and in either direction.

6. In work holding apparatus of the class described comprising work holding mechanism mounted on a chassis; means for moving the chassis including more than two traction elements mounted for swiveling movement and adapted to support said chassis for movement over a surface; at least two of said elements being provided with guiding means adapted to swivel said elements simultaneously through at least 90°, manually and power actuated driving means for said elements including a variable drive transmission mechanism, and means for controlling said transmission mechanism to actuate said elements simultaneously or individually and in either direction.

7. Chassis driving means comprising more than two traction elements mounted for swiveling movement and adapted to support said chassis for movement over a surface; at least two of said elements being provided with guiding means adapted to swivel said elements simultaneously through at least 90°, driving means for said elements including a variable drive transmission mechanism, and means for controlling said transmission mechanism to actuate said elements simultaneously or individually and in either direction.

8. In work holding apparatus comprising holding mechanism mounted on a chassis, traction means for said chassis including two drive wheels, said wheels being adapted for swivelling, guiding means for swivelling said wheels simultaneously, driving means for said wheels including variable transmission mechanism, and said transmission mechanism having operative connections with said wheels for driving either of said wheels while rendering inoperative the driving means for the other of said wheels.

9. In work holding apparatus comprising holding mechanism mounted on a chassis, traction means for said chassis including two drive wheels, said wheels being adapted for swivelling, guiding means for swivelling said wheels simultaneously, driving means for said wheels including a bevel gear in driving relation with each wheel, one of said gears being rigidly mounted on a driven shaft and the other gear idling on said shaft, a reversible driving shaft, and motion transmitting mechanism between said driving shaft and said driven shaft and idling gear, said last named mechanism including a shiftable part adapted to drivingly connect the driving shaft to either said driven shaft alone or to said idling gear alone or to both said driven shaft and said idling gear.

FRANK VETORINO.